United States Patent [19]

Gold et al.

[11] Patent Number: 4,897,660
[45] Date of Patent: Jan. 30, 1990

[54] STRUCTURE RESONANT RADAR DETECTION APPARATUS AND METHOD

[75] Inventors: Archie Gold, Bethesda, Md.; Robert L. Kirkwood, Pacific Palisades, Calif.

[73] Assignee: R & D Associates, M. D. R., Calif.

[21] Appl. No.: 819,528

[22] Filed: Jan. 14, 1986

[51] Int. Cl.⁴ .............................................. G01S 13/24
[52] U.S. Cl. ....................................... 342/192; 342/5;
  342/27; 342/63; 342/64; 342/67; 342/132;
  342/134; 342/161
[58] Field of Search ................ 343/5 BL, 5 FT, 5 SA,
  343/5 W; 342/5, 6, 22, 24, 25, 42–45, 51, 122,
  128–133, 147, 158, 192, 193

[56] References Cited

U.S. PATENT DOCUMENTS

| | | | |
|---|---|---|---|
| 2,179,570 | 11/1939 | Zublin | 342/407 |
| 3,065,930 | 11/1962 | Edelman | 244/3.16 |
| 3,247,514 | 4/1966 | Hamann et al. | 342/44 |
| 3,311,914 | 3/1967 | Barringer | 343/5 SA |
| 3,500,395 | 3/1970 | Foster et al. | 343/5 SA |
| 4,053,886 | 10/1977 | Wright et al. | 343/5 SA |
| 4,054,879 | 10/1977 | Wright et al. | 342/192 |
| 4,126,860 | 11/1978 | Sullivan et al. | 342/21 |
| 4,148,027 | 4/1979 | Nowogrodzki | 342/104 |
| 4,415,898 | 11/1983 | Gaunaurd et al. | 342/192 |
| 4,675,677 | 6/1987 | Von Maydell et al. | 342/25 |
| 4,698,635 | 10/1987 | Hilton et al. | 342/64 |
| 4,700,307 | 10/1987 | Mons et al. | 342/64 X |

OTHER PUBLICATIONS

D. Harris, "The Detection of Electricity Pylons and Cables by Radar"; Radar '77 Conference Record, pp. 555-558.

F. Ulaby et al, "1–35 GHz Microwave Scatterometer"; IEEE Intl. MW Symposium Digest (1979), pp. 551–556.

Primary Examiner—Thomas H. Tarcza
Assistant Examiner—Bernarr Earl Gregory
Attorney, Agent, or Firm—Freilich Hornbaker Rosen & Fernandez

[57] ABSTRACT

Certain man-made structures located in a complex background, such as railroad ties, telephone poles, and fences are detected by a flying craft, using a low powered structure resonant radar system. The radar system transmits a radar signal which includes wavelengths of the same order of magnitude as twice the spacing of the elements of the man-made structure or grating multiples thereof, and transmits them in a plurality of different directions and frequencies. Reflections of the transmitted radar are received and structural resonance backscatter is detected wherein the backscatter amplitude at the resonant frequency is much higher than that at adjacent frequencies or that of the clutter background, indicating the presence of the search-for type of structure. The bright structural resonance backscatter can then be exploted by the structure resonant radar for guidance, homing, etc.

5 Claims, 3 Drawing Sheets

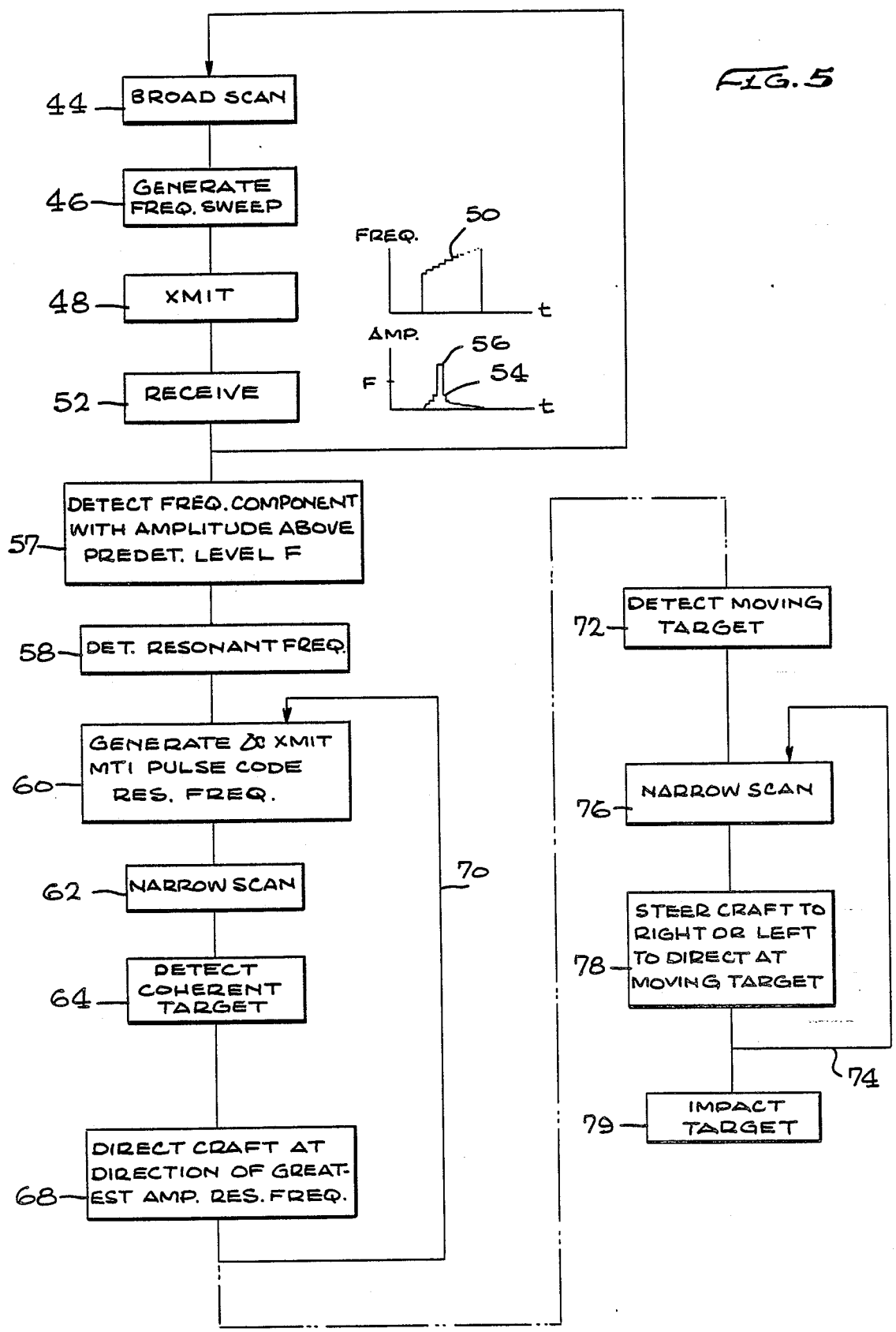

STRUCTURE RESONANT RADAR DETECTION APPARATUS AND METHOD

BACKGROUND OF THE INVENTION

There are situations where it would be desirable for a flying craft such as a propelled missile or smart bomb to detect specific structures on the ground using low powered radar systems connected to relatively simple and low cost logic circuits. The craft could then be directed at the detectable structure to destroy it, or could be directed at a target located at a known position relative to the detectable structure, or at a target moving in conjunction with it such as a train on a railroad track. A system for enabling low cost radar systems to detect the presence or position of particular structures and targets moving in conjunction with these structures would have substantial value.

SUMMARY OF THE INVENTION

In accordance with one embodiment of the present invention, a relatively low cost and low powered radar system is provided which can detect certain structures in a landscape. The system includes a radar transmitter for transmitting radar signals over a range of wavelengths. The system wavelength is then tuned to detect resonances in the reflected signals, which indicate the presence of a man-made structure with periodically spaced elements. The radar signals are of a wavelength of the same order of magnitude as twice the spacing of elements of a particular man-made structure, or a grating index of this wavelength, such as the ties in a railroad track to specifically detect the track. The system can be used to detect any of a variety of periodic man-made structures. The craft can change its direction to fly towards the resonant structure. In the case of a railroad track, the craft can fly low over or near the track, and follow it until the craft strikes a train on the track, or it can employ a moving target indicating (MTI) waveform to detect the presence of a moving train on the tracks, and then use the same radar to home on and strike and/or derail the train.

The novel features of the invention are set forth with particularity in the appended claims. The invention will be best understood from the following description when read in conjunction with the accompanying drawings.

BRIEF DESCRIPTION OF THE DRAWINGS

FIG. 5 is a flow diagram showing the operation of a radar system of FIG. 1.

DESCRIPTION OF THE PREFERRED EMBODIMENTS

Figure 1:
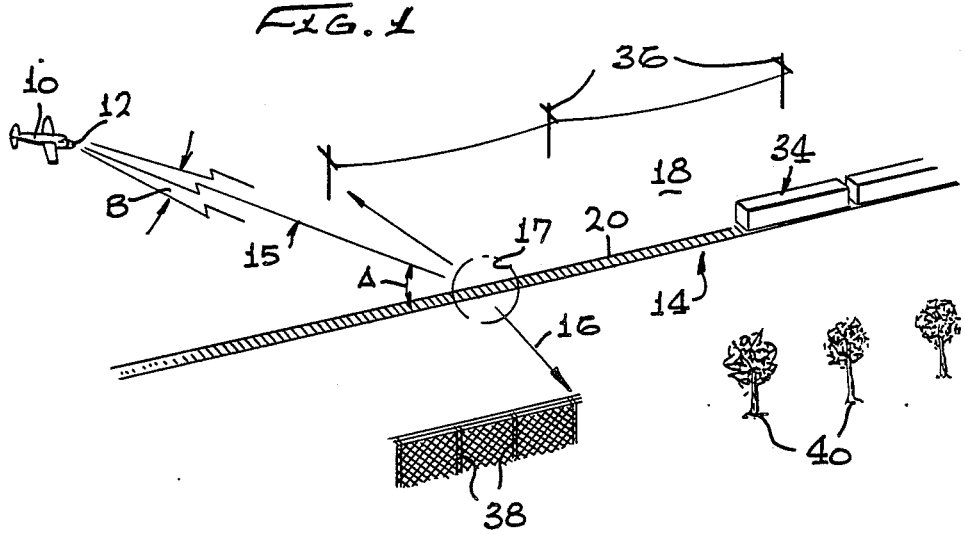
FIG. 1 is a perspective view of a scene containing several resonant structures, and showing a craft containing apparatus of the present invention for detecting a resonant structure.

FIG. 1 illustrates a flying craft 10 which includes a radar system 12 which is attempting to detect a railroad track 14. The radar system 12 transmits and then receives a beam 15 of radar energy over a angle B that covers a ground area 17. The radar system scans the beam, as from side to side indicated at 16, to cover a wide path of the landscape 18. When the radar beam encounters the ties 20 of the railroad track, the regular spacing of the ties results in reflection of a much higher portion of the radar signal which has a wavelength resonant to the separation of the ties along the direction of the radar beam, than does any other radar scatter in the radar beam. The resonant reflection is therefore much higher than for the rest of the landscape. As a result, the craft detects a bright structure resonant backscatter in the direction of the railroad track.

Figure 2:
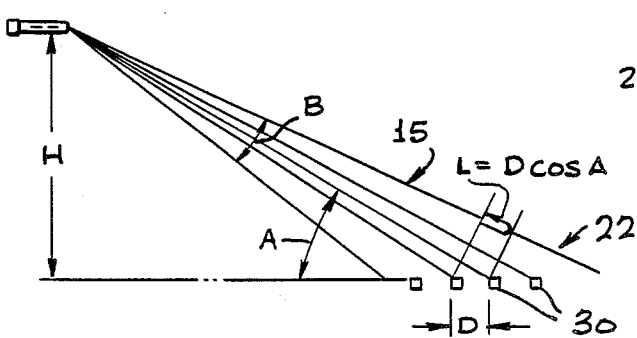
FIG. 2 is a simplified side view of the scene of FIG. 1.

As illustrated in FIG. 2, the radar scattering from each element of the periodic structure, such as the ties 30, will coherently add ween the wavelength of the radar is twice the element spacing or 1/N of that size where N is a whole number (for low slant angles A). For such an element spacing, as seen from the radar, all elements will simultaneously reflect the same phase of subsequent waves. Accordingly, the reflection from the elements will all be in phase and will add coherently to form a large, easily-identified target signature with respect to the general non-resonant background. The coherent backscatter cross section is equal to the square of the number of periodic scattering elements seen by the radar times the cross section of one of the elements, whereas the background clutter results form the random vector addition of scattered reflectors. Therefore, the effective coherent backscatter from the periodic structure is generally much greater than the backscatter from the surrounding terrain.

Figure 4:
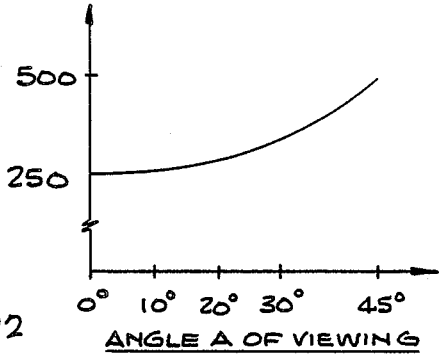
FIG. 4 is a graph showing the variation in resonant frequency of railroad ties with the angle of incidence of radar signals on them.

The present radar system exploits the enhanced signal to background-clutter potential of a periodic structure by adjusting its signal wavelength to assure a resonant backscatter and then detecting the presence of the resonant periodic structure backscatter in the presence of the background clutter. The wavelength required to achieve resonant backscatter will vary as a function of the viewing angles as illustrated in FIG. 4. This change in viewing angle limits the amount of elements which can be coherently integrated for a given signal bandwidth. Therefore, the selection of the transmission frequency and its signal bandwidth is critical to the success of the structure resonant radar system.

The wavelength which will coherently add in FIG. 2 equals twice the element spacing D times the cosine of the viewing or slant angle A. As discussed below, applicant prefers to use a viewing angle of less than about 10°. The cosine of 10° is within 98% of one, so for low angles, the wavelength 2D can be used, or a grating number of 2D (2D divided by a whole number) can be used. The present system can detect periodic structures whose element spacing is within 10% of an average spacing. A wavelength within 10% of a resonant frequency should be transmitted to detect such periodic structures.

Two general approaches can be used to generate the specific frequency and signal bandwidth required to exploit the coherent backscatter from a given periodic structure for a given viewing angle. A first approach is to rapidly vary the transmission frequency of a narrow bandwidth signal over a wide frequency range, where the signal bandwidth is chosen to integrate a selected number of coherent scatters over a selected length, and where the frequency variation is selected to assure that resonant conditions will be attained for the total geometry considered. In this way, the radar transmission center frequency, where coherent scattering is maximized for the given geometry, can be continuously measured and exploited. Additionally, periodic structure coherence backscatter can be used to observe many objects, 20, 36, 38 as illustrated on FIG. 1.

A second approach is to calculate a-priori the center frequency to assure coherent resonance, and the signal bandwidth desired to coherently integrate the appropriate number of periodic structural elements for a given viewing geometry and target structure. As illustrated in FIG. 4, this approach is especially useful for low grazing-angle viewing, such as in the case of a fixed center frequency and signal bandwidth to be used against railroad ties at grazing angles of 10° or less, for example. From a given location above and to the side of the track, the geometry will change with the distance that the radar looks down the track. Consequently, there will be locations where the signals coherently integrate (as at points 123 and 124 in FIG. 3) to maximize the backscatter, followed by locations (such as at 127 and 128) where they interfere to minimize the signal.

Once the resonant center frequency and bandwidth of the integrating pulse is chosen, it is possible to transmit a coherent multiburst waveform of these pulses to achieve a moving target indication (MTI). The MTI waveform and processing using current art, will then be able to identify moving targets relative to the periodic structure, such as trains on the track. Further, the radar transmission antenna and receive structure could also be able to measure the angle of arrival of the backscattered signal allowing navigation along the track, and/or homing in accordance with system requirements.

In one situation, the craft 10 is a missile which is intended to destroy a train 34 of railroad cars on the railroad track. The missile has other navigation guidance (not shown) that directs it to the general area of the railroad track, but it relies upon the detection of the backscatter resonance based on the separation of ties of the track, to locate and track the railroad. At first, the craft searches in frequency to allow for geometric viewing angle uncertainties. When the coherent backscatter resonance maximum is detected, the radar transmits at the wavelength of the resonance to optimize the received signal power. The craft then follows the track using the enhanced coherent backscatter signal. It can then transmit an MTI pulse burst waveform to identify a moving train on the track. I will then attack the train to derail and destroy it as well as to immobilize the use of the track for extended periods. It may be noted that there are a wide variety of periodic man-made structures on the landscape, including telephone poles indicated at 36, the posts of fences indicated at 38, and trees of an orchard or along a road indicated at 40. The flying craft may also use the detection of a particular resonant structure to guide it to a location at a predetermined distance or angle from the resonant structure.

Figure 3:
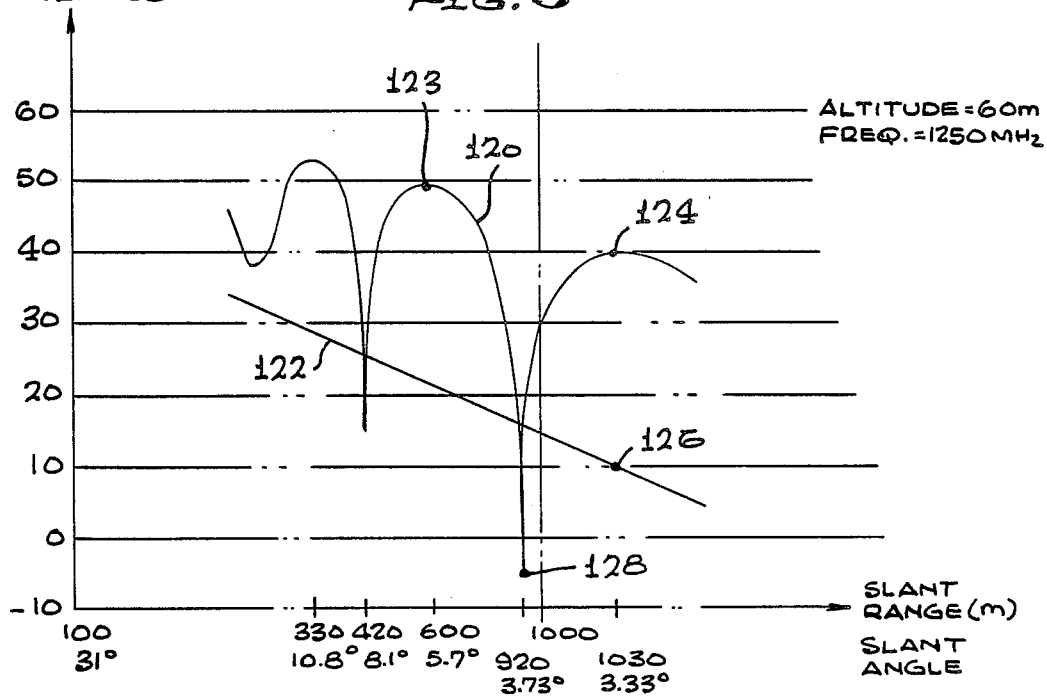
FIG. 3 is a graph showing the variation in received amplitude, with downward angle of viewing (and with the downtrack distance of ties) for a fixed transmittal frequency by the radar system of FIG. 1.

FIG. 3 contains a graph 120 indicating the variation in amplitude of resonant reflected radar signals (reflected from railroad ties), as a function of the slant angle A which is the downward angle of the radar from the horizontal. The Figure also includes a graph 122 indicating the variation in amplitude of clutter with the slant angle. The particular values given are for a case where the radar of a craft is transmitting signals of a fifth grating order, of a frequency of 1250 MHz, and bandwidth of 1 MGz, while the craft is flying at an altitude of 60 meters above the track and is offset by 30 meters from the track. A fifth grating order is used instead of the first grating order, so that a small antenna can be used to radiate and detect along narrow angles. The grating order should generally be no more than about ten, to avoid failure to detect resonance arising from small variations in element spacing. Thus, for railroad ties spaced about one-half meter, a frequency between about 250 MHz and 2500 MHz is used. If the spacing between elements is very uniform, a higher grating number can be used.

At the range of useful operation, the separation between the resonant and clutter graphs of approximately 3 orders of magnitude (30dB) shows that an excellent signal-to-clutter performance can be obtained. In one example, the craft may direct the radar at a downward angle of 3.33° from the horizontal, so it views a track location 1030 meters ahead. The amplitude of the resonant portion of the received signal, indicated at point 124, is about 3 orders of magnitude above the amplitude of the clutter portion indicated at 126. The radar system can be flown at a predetermined altitude such as 60 meters and directed at a predetermined slant angle such at 3.33°, and the frequency can be varied as in 1 MHz steps until a high ratio of resonant signal to clutter is detected. It is also possible to select a-priori, a frequency such as 1250 MHz, and a predetermined altitude and slant angle, for a known tie spacing.

FIG. 5 illustrates a flow diagram, showing operation of a radar system of the type previously described. As a first step 44, the radar system undergoes a broad scan in both angle and frequency to interrogate a wide area of the landscape. At every changing angle about equal to the radar beamwidth, the radar at 46 rapidly sweeps a broad frequency band such as 1225 MHz to 1275 MHz (50MHz) (as in 1 MHz increments) which is transmitted at step 48, the transmitted band indicated at 50. An instant after each transmission, reflections are received at step 52, which may have the characteristics such as shown at 54, with a resonance at frequency 56. In this system the next step 57 is to detect frequency components with an amplitude above a predetermined level F, the resonance at 56 being detected because it is above this level (or is more than twice the average level at frequencies within ± 10% of the resonant frequency).

Upon detection of a resonance, the system at 58 determines the resonant frequency, and at 60 the system generates and transmits an MTI (moving target indicating) pulse burst in a narrow beam at the resonant target on the resonant frequency. Also, thereafter at 62, the system changes to a narrow scan pattern to scan only in the general direction in which the resonance was received thereby continuously tracking the resonant target railroad track. At 64, the tie-resonance is continuously detected. At 68, the direction of the craft is altered or maintained the same, so that it is directed to follow the railroad track. A recirculating line at 70 shows this process of tracking the structural resonance to direct the craft along the railroad continues.

At the same time as the MTI pulse waveform is being transmitted, the same tie-coherent frequency is being used at 72 to detect a target moving with respect to the track. Once this detection is accomplished, homing loop 74 takes over to adjust the angular search scan 76 and steer the craft to home on the moving target 78, achieving a fuze and destruction at 79. The MTI waveform and moving target detection, homing, fuzing, and destruction mechanisms all use current art.

Figure 6:
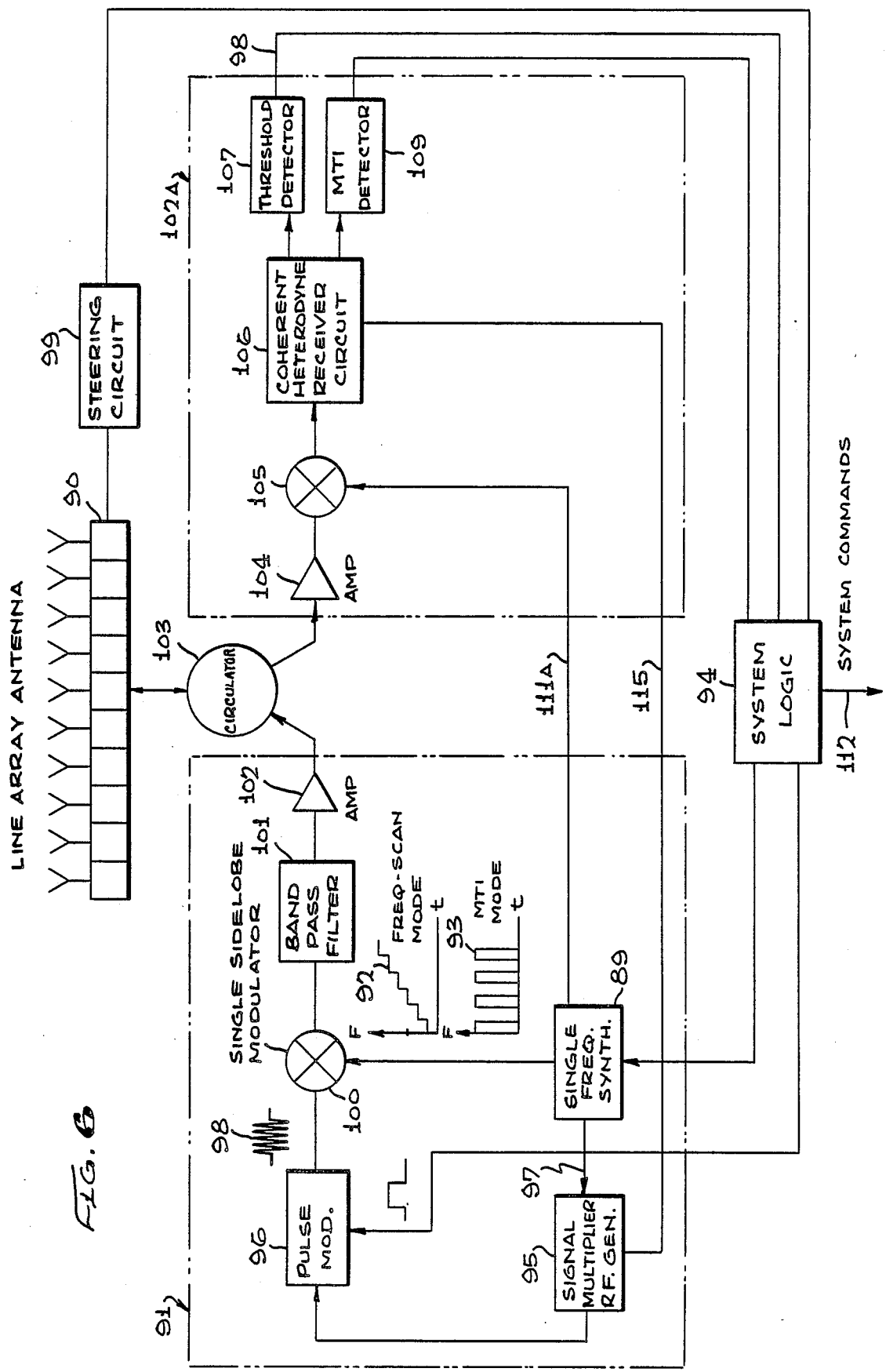
FIG. 6 is a simplified block diagram of the radar system of FIG. 1.

FIG. 6 is a block diagram of a radar system which first searches in both frequency and azimuth angle space with a fan beam formed by a horizontally polarized line phased array antenna 90 to detect the large backscattered signal from structural resonant railroad ties. After locating the railroad and establishing the optimum resonance frequency, it switches to an MTI waveform at the optimum frequency. While transmitting an MTI waveform, the system rapidly sweeps in a small azimuth scan over the railroad to follow the railroad and to both detect and home on a moving train on the railroad.

The radar transmitter 91 can generate two sets of waveforms, one illustrated on graph 92 being a staircase frequency angle search and the other 93 being a constant frequency MTI burst tracking-homing waveform. Both waveforms and all radar system functions and radar sensor outputs, are generated in a radar system logic computer 94. A frequency synthesizer 89 generates a stable lower frequency carrier wave RF signal on line 97. A multiplier chain 95 uses the signal on line 97 as a reference source and multiplies it to an RF base frequency (e.g., 1225 MHz). Under control of system logic 94, a pulse modulator 96 converts the RF signal from multiplier chain 95 into the desired pulsed waveform indicated at 98. Each pulse 98 includes a frequency of 1225 MHz, and lasts for one microsecond.

During a frequency-scan search mode, the frequency synthesizer 89 (under control of system logic 94) generates the staircase waveform 92. The waveform 92 is generated so that for every azimuthal beam position of the line array antenna 90 (controlled by steering circuit 99 which is under the control of the system logic 94), a sequence of frequencies 92 are generated (such as 50 frequencies ranging from 1 MHz to 50 MHz in one MHz steps, each lasting for perhaps 10 microseconds). Each frequency on line 111 is mixed in a single sidelobe modulator 100 with the base frequency pulse 98 (e.g., 1225 MHz), to produce a sequence of pulses (e.g., 50 pulses of 1 usec duration, and of frequencies of 1225 MHz to 1275 MHz). Each rung of the synthesized frequency-scan staircase 92 is held long enough (e.g., 10 usec) to be used as a coherent receiver reference delivered on line 111A to a receiver circuit modulator 105. After completing a complete staircase search, or until a structure resonant signal is received by the receiver 102A, the azimuth beam is moved to the next beam position and the frequency search is repeated. The single sidelobe modulator mixer 100 is used to suppress the unwanted intermodulation sidelobe allowing only the desired coded sidelobe frequency to pass. The waveform is amplified by amplifier 102, passed through a circulator 103, and transmitted by the antenna structure 90.

Upon reception of the reflected signal waveform by the antenna structure, the signal waveform passes through the circulator 103 and a preamplifier to a single sideband modulator 105. In the modulator, the signal waveform is mixed with a coded frequency reference on line 111A which may be identical with the signal on line 111 (although the signal on line 111A may be delayed if the signal on line 111 is brief). The modulator 105 delivers a signal of constant frequency (e.g., 1225 MHz) to a heterodyne receiver circuit 106. However, the amplitude of the signal from the modulator 105 varies with the frequency of the signal (1225 to 1275 MHz) received by the antenna. The coherent heterodyne receiver circuit 106 receives an RF frequency signal (e.g. 1200 MHz) from the RF generator 95 on line 115. In the frequency-scan mode shown in graph 92, the output of the receiver circuit 106 (which is constant, such as 25 MHz feeds a threshold detector 107 whose output on line 108 is used by the system logic 94 to establish when the structure resonant signal is detected relative to the time coded staircase waveform 92. For example, in the graph 54 in FIG. 5, a resonance at 56 is detected. By noting the transmitted frequency when the resonance was detected, the system logic establishes the structure-resonant frequency to be transmitted during the MTI tracking-homing mode. Also, by noting the direction in which the antenna was steered when a resonance was detected, the threshold detector and system logic can indicate the direction in which a resonance is detected.

The radar system performs in a similar manner to that described above during its MTI tracking-homing mode except that a constant frequency MTI waveform, shown by graph 93 (FIG. 6), is generated for each antenna position, and except that the antenna steering 99 is limited by the logic 94 to search over the railroad track. The signal modulations received during the search process is used by the system logic to develop missile steering commands on its output 112. However, during the MTI tracking-homing mode an MTI detector 109 is used which can distinguish targets moving relative to the railroad. The system logic interprets the received signals to identify the presence of a moving train on the railroad. Similar logic is employed to provide homing guidance signals to the flying craft 10. A separate fuze and warhead system is then used to complete the mission.

The circuit of FIG. 6 can also be used to implement a system where the bandwidth and frequency of the radar transmission is known a priori. In this case, the only waveform set generated is the MTI waveform 93. Angle search as well as tracking and homing are performed with this waveform set at the a-priori selected frequency and bandwidth. As in the frequency-scan mode shown at 92, the tracking-homing mode 93 may contain more than one waveform to optimize operating conditions.

Thus, the invention provides a method and apparatus for detecting man-made objects in a complex landscape, while using a relatively low powered radar. The system includes means for directing a radar signal at a downward incline (a plurality of degrees away from the vertical) and for detecting a resonance in the reflections which indicates the presence of a man-made object which includes multiple elements spaced largely uniformly along the ground.

Although particular embodiments of the invention have been described and illustrated herein, it is recognized that modifications and variations may readily occur to those skilled in the art, and consequently, it is intended that the claims be interpreted to cover such modifications and equivalents.

WHAT IS CLAIMED IS:

1. A method for locating a man-made structure located on land which has a multiplicity of substantially uniformly spaced elements, from a flying craft, comprising:

transmitting radar signals in a plurality of different directions that are all at a downward incline from the craft toward the ground;

receiving reflections of said radar signals and detecting a resonant frequency that is of at least twice the amplitude of the average frequencies of the received signals; and detecting the direction from which the received signals that included the resonant frequency, was received.

2. The method described in claim 1 including: directing said craft in said direction.

3. A method for locating a man-made structure containing periodically-spaced elements, comprising:

generating a signal of a frequency, whose inverse times the speed of light approximately equals twice the spacing of said elements times a whole number and transmitting said signal in a known direction towards the ground;

at a time after transmitting approximately equal to the travel time of reflections from the ground, receiving reflections of said signal;

periodically varying the frequency of said signal, and periodically varying said known direction of transmittal, and comparing the amplitudes of the received signal received after each varying of the frequency and after each varying of the direction of transmittal, and detecting any received signal which is of an amplitude at least twice the average amplitude of all received signals.

4. Apparatus for locating a man-made structure located on land which has a multiplicity of substantially uniformly spaced elements, from a flying craft, comprising:

means for transmitting radar signals in a plurality of different directions that are all at a downward incline from the craft toward the ground;

means for receiving reflections of said radar signals and detecting a resonant frequency that is of at least twice the amplitude of the average frequencies of the received signals; and means for detecting the direction from which the received signals that included the resonant frequency, was received.

5. Apparatus for locating a man-made structure containing periodically-spaced elements, comprising:

means for generating a signal of a frequency, whose inverse times the speed of light approximately equals twice the spacing of said elements times a whole number, and for transmitting said signal in a known direction towards the ground;

means for receiving reflections of said signal at a time after transmitting approximately equal to the travel time of reflections from the ground;

periodically varying the frequency of said signal, and periodically varying said known direction of transmittal, and comparing the amplitudes of the received signal received after each varying of the frequency and after each varying of the direction of transmittal, and detecting any received signal which is of an amplitude at least twice the average amplitude of all received signals.

* * * * *